United States Patent [19]

Fischer

[11] Patent Number: 5,342,106
[45] Date of Patent: Aug. 30, 1994

[54] SHOCK-ABSORBING VEHICLE FRAME/CHASSIS MOUNTING SYSTEM

[75] Inventor: Carl J. Fischer, Nappanee, Ind.

[73] Assignee: Four Winds International Corporation, Elkhart, Ind.

[21] Appl. No.: 982,218

[22] Filed: Nov. 25, 1992

Related U.S. Application Data

[63] Continuation-in-part of Ser. No. 873,723, Apr. 27, 1992, abandoned.

[51] Int. Cl.⁵ ............................................. B62D 24/04
[52] U.S. Cl. ................................. 296/204; 296/35.1; 296/164
[58] Field of Search ................. 296/35.1, 164, 183, 296/203, 204, 29; 280/788, 790; 248/621, 632, 634, 635; 267/141, 141.1–141.3

[56] References Cited

U.S. PATENT DOCUMENTS

| | | | |
|---|---|---|---|
| 1,870,418 | 8/1932 | Mayer | 296/35.1 |
| 2,838,339 | 6/1958 | Schaldenbrand | 296/35.1 |
| 3,112,950 | 12/1963 | Jaskowiak | 280/790 X |
| 3,120,382 | 2/1964 | Paulsen | 267/141.1 X |
| 3,177,032 | 4/1965 | Jaskowiak | 296/35.1 |
| 3,250,565 | 5/1966 | Jaskowiak | 296/35.1 |
| 4,198,187 | 4/1980 | Mountz | 296/204 X |
| 4,566,678 | 1/1986 | Anderson | 267/141.1 |
| 4,819,980 | 4/1989 | Sakata et al. | 296/35.1 |
| 4,858,880 | 8/1989 | Durand | 248/635 |
| 5,114,183 | 5/1992 | Haluda | 280/788 X |
| 5,131,714 | 7/1992 | Evans, Sr. et al. | 296/203 X |
| 5,143,416 | 9/1992 | Karapetian | 296/183 X |
| 5,178,433 | 1/1993 | Wagner | 296/35.1 |

FOREIGN PATENT DOCUMENTS

| | | | |
|---|---|---|---|
| 188234 | 2/1956 | Austria | 248/635 |
| 1157946 | 1/1958 | France | 296/183 |
| 0169775 | 7/1991 | Japan | 296/35.1 |
| 569378 | 5/1945 | United Kingdom | 296/35.1 |

*Primary Examiner*—Dennis H. Pedder
*Attorney, Agent, or Firm*—Killworth, Gottman, Hagan & Schaeff

[57] ABSTRACT

A system for mounting a vehicle frame to a chassis. The chassis and frame both include a pair of spaced longitudinal side rails and a plurality of lateral cross rails. Shock absorbing bushings are connected between the chassis and frame usually through spacer bars to absorb road vibrations and other forces generated during travel.

6 Claims, 4 Drawing Sheets

SHOCK-ABSORBING VEHICLE FRAME/CHASSIS MOUNTING SYSTEM

BACKGROUND OF THE INVENTION

This is a continuation-in-part application Ser. No. 873,723, filed on Apr. 27, 1992, now abandoned.

This invention is related to a vehicle chassis and has special application to a rubber mounted chassis for recreational vehicles.

Recreational vehicle frame usually have a suspension system composed of shock absorbers with coiled springs attached to the vehicle chassis near the wheels to bear the main load. These chassis/frame connections do not have a suspension system located at the connecting point of the longitudinal side rails and cross girders. These vehicles fall to protect the rails and cross girders from dynamic vibrations of the chassis and from lateral and vertical forces exerted on the vehicle during road travel.

SUMMARY OF THE INVENTION

The chassis of this vehicle includes spaced longitudinal side rails which bear the vehicle load. The vehicle frame includes longitudinal frame rails and a plurality of transverse girders spanning the frame rails. The vehicle frame is spaced from the chassis by a plurality of cushioning bushings secured between the chassis and a spacer connected to the vehicle frame.

The cushioning connection between the chassis and frame absorbs vibrational energy during road travel. Further, the cushioning system reduces wear and tear on the vehicle frame by transferring this generated energy into the bushings rather than to the structural members and joints of the frame as is the case with conventional suspension systems.

Hence, it is an object of this invention to provide a shock absorbing system for a vehicle chassis and frame that absorbs energy from lateral or vertical forces generated during road travel.

Other objects will become apparent upon a reading of the following description.

DESCRIPTION OF THE PREFERRED EMBODIMENT

Figure 1:
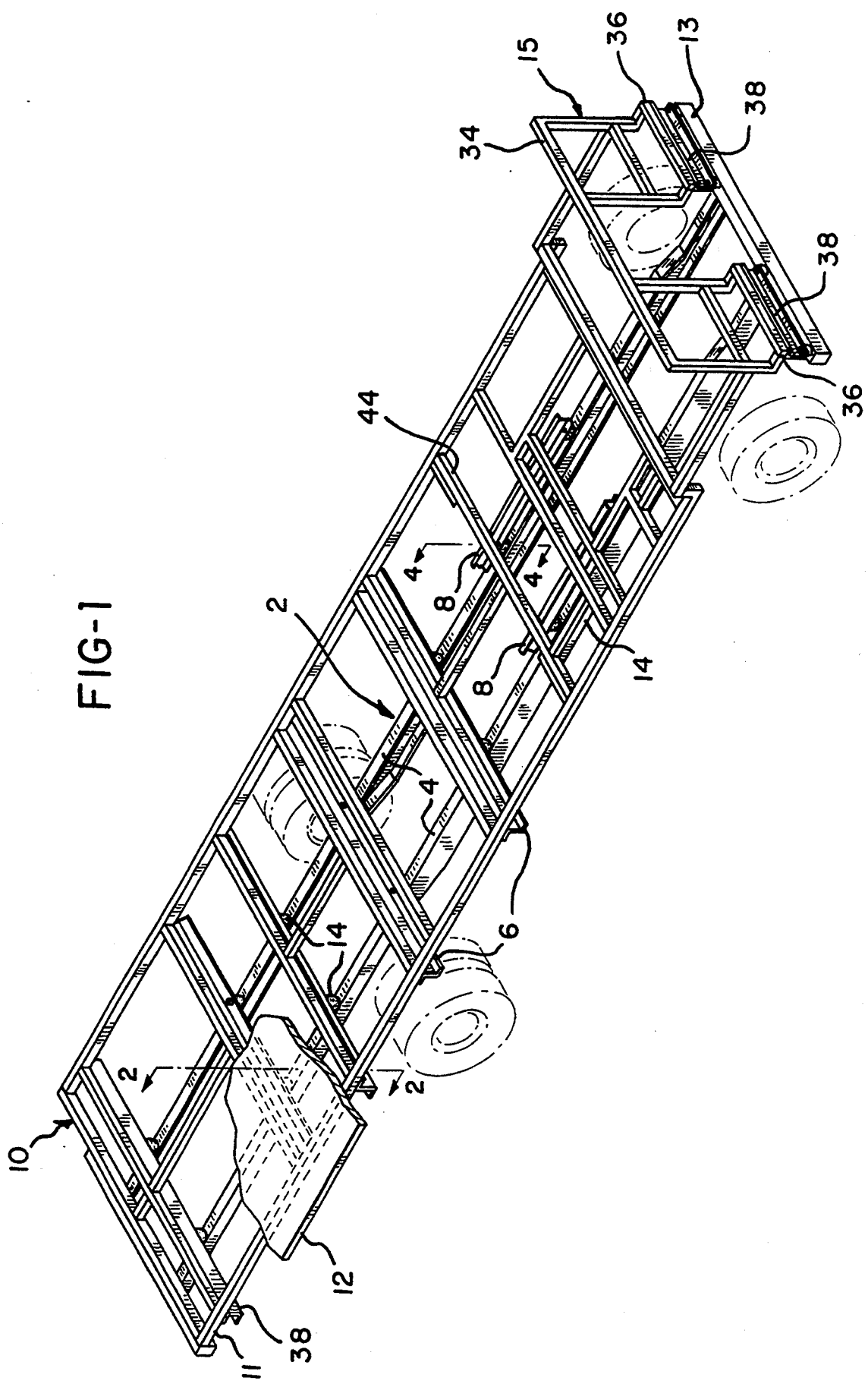
FIG. 1 is a perspective view of the chassis of this invention.
Figure 2:
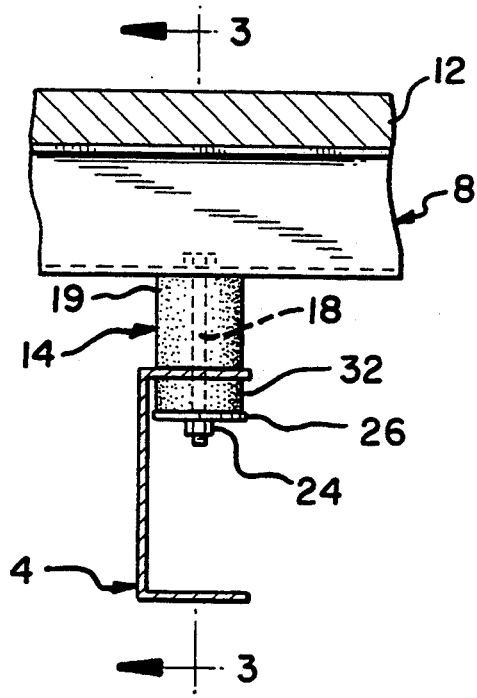
FIG. 2 is a fragmentary view of FIG. 1 along lines 2—2.

The preferred embodiment herein described is not intended to be exhaustive or to limit the invention to the precise form disclosed. It is chosen and described to explain the principles of the invention and its application and practical use so that others skilled in the art may follow its teachings.

Referring to the drawings, the chassis 2 includes a pair of spaced longitudinal side rails 4 extending the length of the vehicle and a plurality of transverse cross rails (not shown). Chassis 2 bears the main load of the vehicle frame 10.

Frame 10 includes a plurality of longitudinal frame rails 11 spanned by transverse rails 44. Rails 11 and 44 are commonly connected as by welding with their locations and shapers dependent upon the individual vehicle design.

Figure 4:
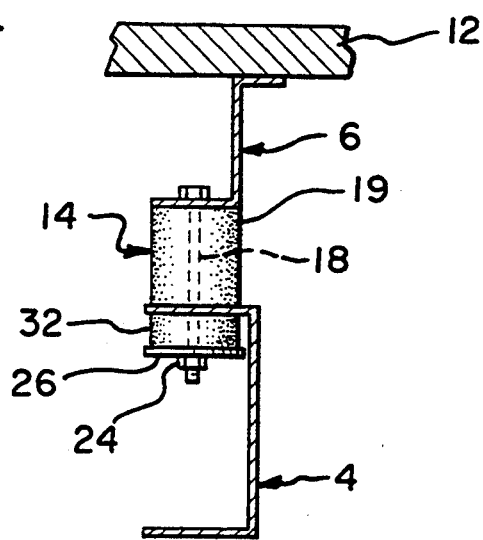
FIG. 4 is a fragmentary view of FIG. 1 along line 4—4.

The suspension system of this invention includes a plurality of spacer bars, shown as C-shaped bars 38 and Z-shaped bars 6 and 8. The C-shaped bars 38 are oriented generally transversely across chassis rails 4 at the front and rear of the vehicle as shown. The Z-shaped bars 6 may be oriented in a similar fashion, but the bars 8 which are located beneath the driver's and passenger's section of the vehicle are preferably oriented longitudinally and spaced directly above rails 4 as shown in FIGS. 1 and 4. Frame 10 is generally oriented atop suspension system 1 with its transverse rails 44 located directly atop bars 6, 8 and 38 as shown. Frame 10 is preferably connected to bars 6, 8 and 38 as by welding and supports overlying floor 12. All of the rails and bars of chassis 2, frame 10, and suspension system 1 are preferably made of steel or other suitable load bearing material.

Figure 3:
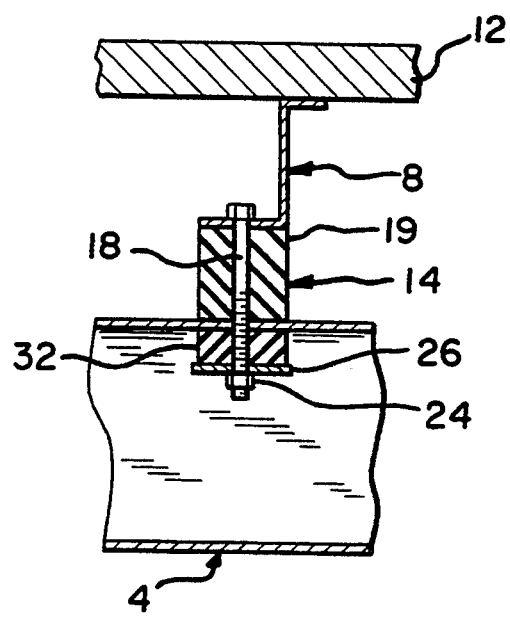
FIG. 3 is a sectional view of FIG. 2 along line 3—3.

Suspension 1 also includes cushioning members 14, shown as cylindrical bushings, which are positioned between chassis rails 4 and bars 6, 8 and 38. Each bushing 14 may include an upper portion 19 and a lower portion 32 located above and below the upper edge, respectively of rail 4. Each bushing 14 is secured between rail 4 and bars 6, 8 or 38 as by bolt 18 (as shown in FIG. 3) washer 26 and nut 24.

Each bushing 14 is formed of a shock-absorbing material such as natural or synthetic rubber having a durometer hardness of 85-90. The bushing functions as an energy mount transfer point allowing the rubber be dampened. The bushing isolates the motor home from the chassis. As shown, the bushings 14 are approximately three inches high and two and three-quarter inches thick and can withstand forces up to 3200 psi.

Figure 6:
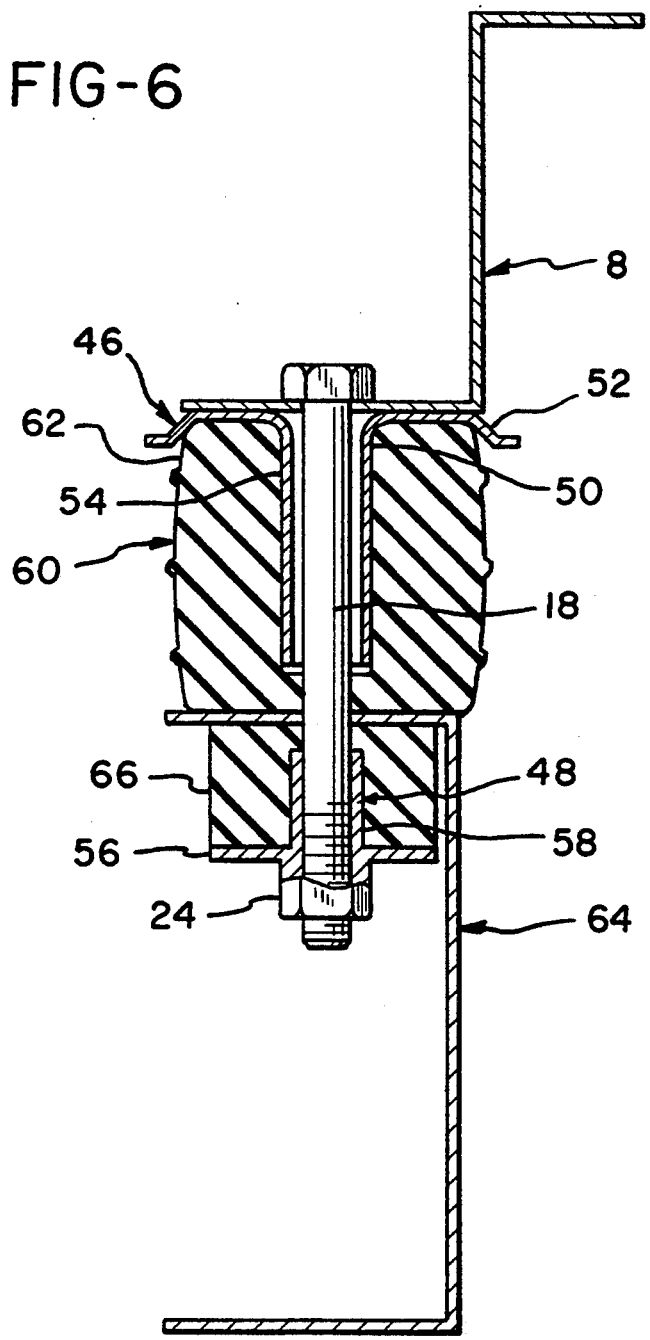
FIG. 6 is a fragmentary view of FIG. 5 as seen along lines 6—6.

Each bushing 80 can also be generally cylindrical with central bulges and converging ends to form a barrel shape as seen in FIG. 6. This shape allows the bushing's resistance to increase as more force is applied to it, as for example when the vehicle is turning.

Figure 5:
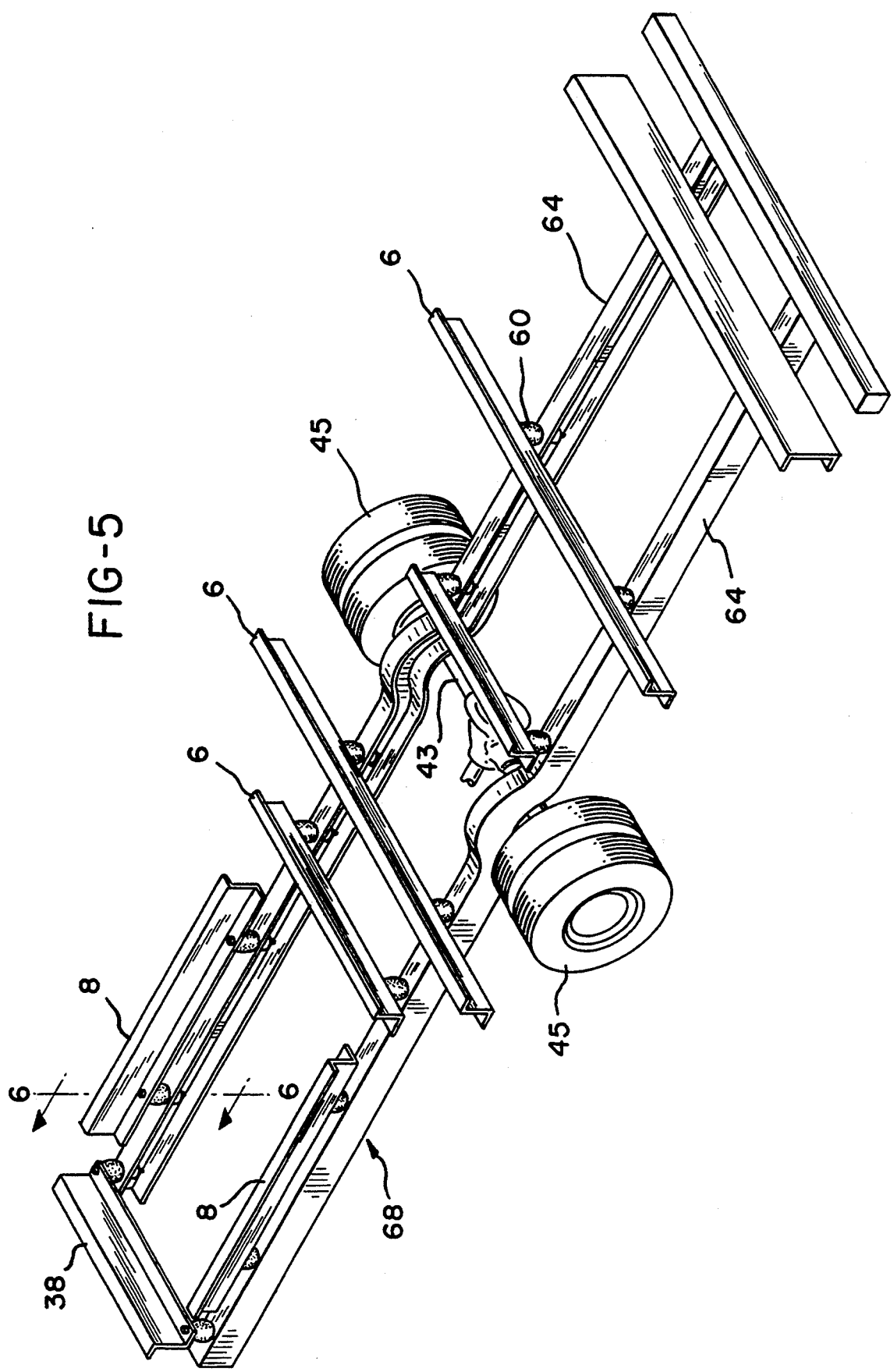
FIG. 5 is a perspective view of the chassis of this invention.

The figures illustrate the rubber mounted chassis as applied to a Class A type motor home. However, the chassis of a Class-C type motor home may be similarly rubber mounted as well as shown in FIG. 5. This chassis 40 is similar to the one for the Class-A type motor home except that it has a hump 42 on each rail 64 over axle 43 connecting rear wheels 45. This chassis includes a C-shaped bar 38 oriented generally transversely across chassis rails 64 at the rear of the cab 68 of the vehicle as shown in FIG. 5. The Z-shaped bars 6 may be oriented in a similar fashion, however the bars 8 located near the front of the cab 68 are preferably oriented longitudinally and spaced directly above rails 64 as shown in FIG. 5. The frame is similar to the one of the Class-C vehicle. The means for fastening the bushing is a Ford type washer 46 as shown in detail by FIG. 6. The Ford type washer 46 includes an interfitting male part or lower insert 48 and a female part or upper insert 50. The female part has a washer or covering 52 at its top and a hollow neck or shaft 54 extending downwardly. The male part 48 has a washer or covering 56 at its bottom and a hollow shaft or neck 58 extending upwardly. Each bushing also may include an upper portion 62 and a lower portion 66 located above and below the upper edge, respectively of rail 4. Each bushing 60 is also secured between rail 64 and bars 38, 6 or 8 as by necks 54, 58 with bolt 18 inserted through the necks (as shown in FIG. 6) and secured therein by nut 24.

The bushings due to their height increase the storage space between the chassis and frame without adding greatly to the weight of the vehicle. In previous ways that increase this storage space between the chassis and frame, one would place trusses between the frame and vehicle and thereby increase the height. However, many trusses are needed to support the frame and hence divide the large storing space into smaller units making it difficult to store large objects. Also, the trusses add to the weight of the vehicle which reduces the gas mileage and also allows less weight to be stored in lieu of the transportation department's maximum traveling weight for such vehicles.

Reference numeral 15 refers generally to the front grille frame of the vehicle. Frame 15 includes lower cross girder 13 which is connected as by welding to rails 4 and extends laterally outwardly thereof. C-channels 38 are connected to girder 13 in a spaced relationship as by bushings 14 as described above. The remainder of grille frame 15 consists of intersecting vertical frame members 45 and horizontal frame members 34, 36 connected to the front, or engine compartment, portion of frame 10.

Suspension system 1 functions to absorb vibrational and other forces transmitted throughout chassis 2 as the vehicle travels down the road. These forces are absorbed by bushings 14 prior to transmission of the force to frame 10, thus allowing for a more comfortable ride and restricting the wear and tear on frame 10 which normally occurs when conventional frame/chassis connection are employed. The transmission of these forces is also absorbed by bushings 14 which space front grille frame 15 from frontmost girder 13 to ease the vibrational strain on the engines.

It is understood that the above description does not limit the invention to the given details, but may be modified within the scope of the following claims.

I claim:

1. In combination, a vehicle chassis and support frame, said chassis including spaced longitudinal side rails, said frame including spaced longitudinal frame rails spanned by transverse frame cross rails, the improvement comprising suspension means connected between said chassis and support frame for absorbing forces generated during road travel, said suspension means including a plurality of spacer bars and a plurality of upper and lower bushings, some of said spacer bars being oriented longitudinally along the said chassis side rails and located between some of said upper bushings and said transverse frame cross rails, other of said spacer bars oriented longitudinally along said transverse frame cross rails and located between other of said upper bushings and said transverse frame cross rails, said spacer bars being connected to said upper bushings by fasteners, said lower bushings being located in vertical alignment under said upper bushings and carried by said chassis side rails in a separated relationship from said vertically aligned upper bushings.

2. The combination of 1 wherein said bushings are of a rubber material having an approximate durometer hardness of 85–90.

3. The combination of claim 1 wherein said upper bushings are barrel shaped.

4. The combination of claim 3 wherein said bushing is at least three inches high.

5. The combination of claim 1 wherein said some spacer bars are Z like-shaped in cross section and said other spacer bars are C-shaped in cross-section.

6. A vehicle suspension system means for connecting a chassis having spaced longitudinal side rails, and an overlying support frame including spaced longitudinal frame rails spanned by transverse frame cross rails for absorbing forces generated during road travel, said suspension means comprising
upper barrel shaped bushings,
vertically aligned lower cylindrical bushings,
spacer bars connected to said support frame, each of said upper bushings located between one of said spacer bars and said chassis, said lower bushings located below portions of said chassis, said upper bushings being barrel shaped, the circumference of the upper and lower ends of said upper bushings being less than the circumference at the center of said upper bushings, said spacer bars being Z like-shaped in cross-section, some of said spacer bars oriented longitudinally along said chassis side rails and said other spacer bars longitudinally oriented along said transverse frame cross rails, and
fasteners each of which interconnect one of said spacer bars, said upper bushings and said lower bushings to said chassis.

* * * * *